March 3, 1964     R. E. BORGESON     3,122,963
RECESS HEAD SCREW
Filed Aug. 11, 1961
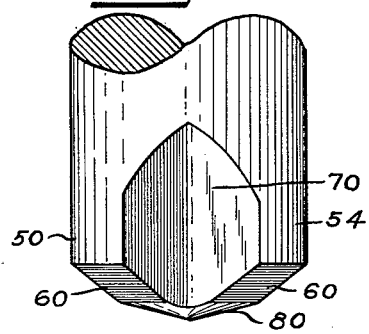
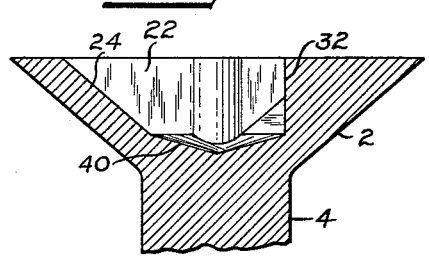
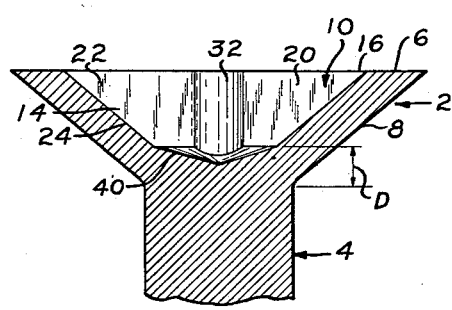
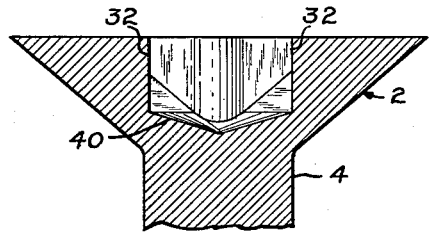
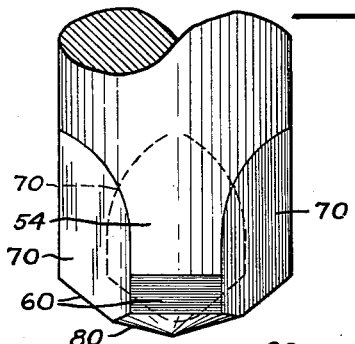
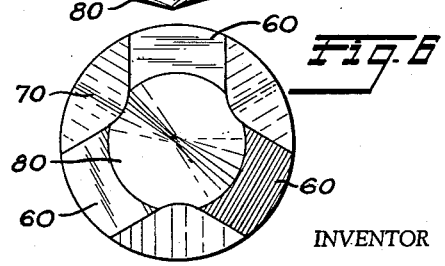
INVENTOR
RUDOLPH E. BORGESON
BY Scrivener + Parker
ATTORNEYS United States Patent Office 3,122,963
Patented Mar. 3, 1964

3,122,963
RECESS HEAD SCREW
Rudolph E. Borgeson, Paxton, Mass., assignor to Reed & Prince Manufacturing Company, Worcester, Mass., a corporation of Massachusetts
Filed Aug. 11, 1961, Ser. No. 130,810
1 Claim. (Cl. 85—45)

This invention relates broadly to threaded fasteners and, more particularly, to headed screws, bolts and the like of the type having a driving recess in the head.

Threaded fasteners having recessed or socketed heads, as distinguished from slotted heads, have come into very widespread use, due in large part to the proven superiority of such fasteners, particularly in manufacturing and assembly operations involving large quantities of fasteners and also involving the use of power drivers. The development of this art has resulted in the provision of fasteners having greater torque capacity than slotted screws and the like, and which may be driven much more quickly and efficiently, and with much less hazard to the work, than slotted fasteners.

Some of the principal factors influencing the design of the recess of a recessed head screw are the ease of insertion of the driving tool into the recess, the configurations of the recess and tool to provide maximum resistance to any tendency of the tool to be forced or "rocked" out of the recess when high torque is imposed by the tool onto the screw, the ability of the fastener to withstand high stresses without weakening or failure under high torque operating conditions, and the configurations of the recess and tool to prevent binding between them, with consequent ease of removal of the tool from the recess. While these factors have principally influenced the design of recessed head screws and the tools for driving them, it is known that all recessed head screw designs have represented a compromise of one or more of these factors in order to achieve some special result with one or more of the other factors. It has, in fact, been believed that some of these factors are mutually exclusive, and that no recess, or recess and tool combination, could have all of these advantageous features.

The principal object of this invention has therefore been to provide, in a recessed head fastener such as a screw, a recess, and a recess and driving tool combination, each having such a construction and configuration that all of these advantageous features are achieved without substantial sacrifice of any of them. Thus, the recess according to the invention permits easy insertion of the driving tool into the recess and easy removal therefrom, the latter implying that the parts are so constructed that no binding takes place between the recess walls and the tool. These advantageous results are achieved without weakening the screw, particularly at its most critical area, which is at and adjacent the juncture of the head and the shank. At the same time, the recess is so constructed that it co-operates with the driving tool to transmit the full torque of the tool, even a high torque operation, without any tendency of the walls of the recess to force the tool out of the recess.

These advantageous features of the fastener, and of the fastener and driving tool combination, which are provided by this invention, result from the new and improved construction and configuration of the recess of a recessed head screw, and the new and improved construction and configuration of a driving tool particularly intended to drive a fastener according to the invention, both of which are described in the following specification and are illustrated in the accompanying drawing in which:

FIG. 1 is a top plan view of the head of a screw according to the present invention;

FIG. 2 is a sectional view through the screw of FIG. 1, taken on line A—A of FIG. 1;

FIG. 3 is a side elevation of the lowermost end of a driving tool formed according to the invention for engagement with the recess of the screw shown in FIGS. 1 and 2;

FIG. 4 is a sectional view through the screw of FIGS. 1 and 2, taken on line A—B of FIG. 1;

FIG. 5 is a sectional view taken on line C—C of FIG. 1;

FIG. 6 is an axial view of the lowermost end of the driving tool shown in FIG. 3, and FIG. 7 is a side elevational view of the lower end of the driving tool, turned 90° about the axis thereof from the position shown in FIG. 3.

The threaded fastener provided by this invention has as its principal parts a head and a threaded shank. The head of the screw may be of any of the well known conventional types, such as flat head, round head, filister head, oval filister head and the like. The head of the screw, regardless of its shape or size, is formed in its upper surface with a recess, which is adapted and intended to receive a tool by which the screw is turned. The shape and configuration of the recess and of the co-operating tool, form the subject matter of this invention and provides the new and advantageous results set forth above.

The embodiment of the invention which is described in this specification and illustrated in the drawings is a screw having a head 2 and a threaded shank 4. The head has a flat upper surface 6 and a countersunk lower surface 8, the shank being concentric with the head and extending axially from the center of the countersunk lower surface of the head.

A tool receiving recess 10 is formed in the upper surface of the head 2 and comprises a central opening 12 from which there extend three radial grooves 14, 16, 18, which are spaced symmetrically and equi-angularly about the axis of the screw, whereby corresponding parts thereof, such as their radial center lines, are separated by angles of 120°. The recesses are identical in size, position and configuration and each comprises side walls 20, 22, which are parallel to the axis of the screw, and a bottom wall 24 which extends from the upper surface of the head angularly downward toward the axis of the screw and toward the juncture of the head and shank of the screw. The center line of each of these grooves lies on a radius of the head, and the side walls of each groove are equidistant from the radial center line thereof and parallel to it. The bottom walls 24 extend downwardly into the head the same distance and each of them terminates at its lower end in an area of the head which is removed from the juncture of the shank and the head by a substantial distance, which is indicated at D in FIG. 2. The lower, or inner, edges of the three grooves are outwardly curved and are concentric with the axis of the screw, as shown clearly in FIG. 1, and lies in a common circle which is interrupted only between adjacent recesses, as shown at 30 in FIG. 1. The circle on which the inner edges of the grooves lie forms the upper, or outer, edge of an inverted conical recess which extends inwardly of the head of the screw, and which is indicated at 40 in FIG. 2. The depth of this conical recess is such that its apex, which is its innermost point, lies in the center line of the screw and is positioned between the upper surface of the head and the juncture of the shank of the screw with the countersunk lower surface of the head. It will be seen, therefore, that no part of the recess in the upper surface of the head extends into the area of connection between the head and the shank.

As stated above, an important feature of the invention is the provision of a shallow recess in the head to permit the easy insertion and withdrawal of a driving tool, and the construction of the recess in such a way that there will be a large surface of engagement between the recess and the driving tool. The recess provided by the invention has a shallow configuration and the driving tool may therefore be easily inserted into and removed from it, while the extended configuration of the recess causes there to be a large area of engagement between the recess and the driving tool, thereby permitting the transmission of a large force from the tool to the screw and, at the same time, reducing the pressure of the driving tool per unit of area of the side walls of the recess, and preventing or substantially reducing the tendency of the tool to be forced out of the recess. These advantageous results produced by the invention are caused by the size, configuration and position of the recess and, in particular, the radial grooves which form part thereof. In the preferred form of the invention shown in the drawings the bottom wall 24 of each groove is inclined to a plane at right angles to the axis of the screw, such as the upper surface of the head of a flat head screw, by a relatively large angle which, in a preferred form of the invention, may be approximately 50°. The bottom 24 of each groove will therefore be as flat as will reasonably be permitted by the size of the head, and the grooves will be elongated in a radial direction, thus providing three long and shallow grooves for the reception of corresponding parts of a driving tool. As stated above, the lower or inner, arcuate edge of each inclined bottom wall 24 is positioned substantially above the juncture of the shank with the countersunk lower surface of the head, and the apex of the inner conical recess is also located above or outwardly of this area of juncture. In the preferred form of the invention the conical surface 40 of this lower or innermost part of the central recess also lies entirely between the upper surface of the screw and the area of juncture of the shank and head. In the preferred practice of the invention, this conical surface is disposed at an angle of approximately 75° to the axis of the screw and the recess formed by this surface is therefore quite shallow. Thus, the combined recess formed by the three grooves, the central opening 12, and the inner conical recess is shallow but, at the same time, is of considerable radial extent along each groove. In the preferred form of the invention which is disclosed herein each groove extends to a radial distance of about 75% of the radius of the upper surface of the head. There is therefore provided a shallow tool-receiving recess having three radially extending grooves, the side walls of which are of very substantial length and therefore provide a large area for engagement by the driving tool. The shallow configuration of the entire recess insures that the driving tool may be easily inserted into it and removed from it, while the elongated side walls of the radial grooves or recesses insure that there will be a very large area of engagement between the co-operating surfaces of the driving tool and the head, with consequent reduced, or minimum, pressure of the driving tool per unit of area of the driven surfaces of the recess.

Means are provided by the invention for further assuring easy insertion and removal of the driving tool, and the improvement and increase of the driving connection between the tool and the screw, while at the same time reducing to a minimum any tendency of the tool to be forced out of the recess. These means comprise the three walls 32 which, respectively, connect adjacent side walls of adjacent grooves 14, 16, 18. Thus, as particularly shown in FIGS. 1 and 5, the adjacent side walls of each pair of grooves are connected by a curved wall which is arcuately directed inwardly toward the axis of the screw and which is parallel to such axis. This wall forms a smooth curve between the two side walls of each pair of grooves and co-operates with a similarly shaped wall on the tool to provide an area of engagement between the tool and the screw which is not inclined to the axis of the screw and therefore transmits turning force from the tool to the screw without the production of any force tending to force the tool from the recess. There are three of these inwardly curved, axial surfaces and, as their total area is substantial and forms a large proportion of the total possible area of engagement between the tool and the recess, a large part of the turning force of the tool is transmitted to the screw through these surfaces.

The driving tool provided by the invention is disclosed in FIGS. 3, 6 and 7 of the drawings and is shaped at its bit end to co-operate with the recess in the head of the screw in such a way that the desired advantageous features of the invention are achieved. The bit end of the driving tool is generally shaped to closely fit and substantially, but not completely, fill the recess in the head of the screw, and therefore is provided with three wings 50, 52, 54, corresponding parts of which, such as their radial center lines, are spaced equidistantly about the axis of the tool and are therefore separated by angles of 120°. Adjacent its outer end each wing is formed with a surface 60 which is inclined to the axis of the shank of the tool by an angle which, in the preferred form of the invention, is approximately 50°, so that this surface 60 will engage in surface-to-surface contact with the inclined bottom wall 24 of the groove within which the wing is received. Between each pair of adjacent wings of the tool there is provided an inwardly curved wall 70 and these three curved walls are shaped on the same arc as the curved walls 32 which extend between adjacent side walls of the three grooves in the head. The inclined surfaces 60 adjacent the outer end of each wing are not continued to a point in the axis of the shank of the tool but terminate at their outer ends in the edge of the base of a convex pointed part 80 which is shaped, in general, to correspond to the concave bottom part 40 of the recess in the head. It will be recalled that the conical wall of the recess 40 is inclined at an angle at about 75° to the axis of the screw, thus providing a shallow recess. The surface 80 which defines the point on the bit end of the tool is inclined to the axis of the shank of the tool by an angle of about 80° and the convex part defined by this surface is therefore flatter, or shallower, than the concave recess in the head. Thus when the bit end of the tool is inserted into the recess in the head convex part 80 of the tool will not fully engage the wall of the concave recess 40. The provision of the convex part on the end of the tool and the provision of the concave bottom part of the recess in the head increases the stability of engagement between the tool and the head because the surfaces are complementary and very closely adjacent, although not touching. As they do not engage each other, any possible tendency of these surfaces to bind is eliminated.

By providing a recess having three grooves and a tool having three wings I achieve maximum torsional strength of both the driver and recess, maximum tensile strength of the head, and good stability of engagement between the driver and the recess. These advantageous features, resulting in part from the provision of three, instead of two or four or more grooves, are increased, amplified and complemented by the other features of the recess and the tool, such as the elongated shallow grooves, the central concave bottom part recess and the non-inclined side walls of the grooves and the non-inclined curved walls connecting the side walls of the grooves.

While I have described and illustrated one form which my invention may take, it will be understood by those skilled in the art that other embodiments, as well as modifications of that disclosed, may be made and practiced without departing in any way from the spirit or scope of the invention, for the limits of which reference must be made to the appended claim.

What is claimed is:

A screw having a shank and a head and having a driving tool receiving recess extending into the head from the upper surface thereof, the recess being concentric with the longitudinal axis of the screw and comprising a central portion having a concave bottom part shaped as an inverted cone having a substantially circular upper edge, the recess also having three long, shallow grooves disposed symmetrically about the longitudinal axis of the screw and extending outwardly from the substantially circular upper edge of the inverted concave bottom part and terminating adjacent the outer periphery of the head in the upper surface thereof, each of said grooves having side walls which are parallel to the axis of the screw and equidistantly spaced on opposite sides of the radial center line of the groove and parallel thereto, each of said grooves having a bottom wall intersecting the lower edges of the side walls of the groove and extending apwardly and outwardly from the periphery of the substantially circular upper edge of the concave bottom part of the tool receiving recess at an angle to the longitudinal axis of the screw which is less than that of said concave bottom part, the maximum depth of each groove being substantially less than the radial length thereof whereby the grooves are radially elongated and shallow to provide substantial bearing wall surface without requiring deep insertion of the tool into the recess, each side wall of each groove being connected to the adjacent side wall of the adjacent groove by an inwardly curved wall which is parallel to the axis of the screw, said connecting walls bounding in part the central portion of the recess and at their lower edges intersecting and interrupting the substantially circular upper edge of the concave bottom part of the recess.

References Cited in the file of this patent

UNITED STATES PATENTS

| | | |
|---|---|---|
| 297,004 | Potts | Apr. 15, 1884 |
| 2,046,837 | Phillips | July 7, 1936 |
| 2,046,839 | Phillips | July 7, 1936 |
| 2,173,707 | Brown | Sept. 19, 1939 |
| 2,182,568 | Olson | Dec. 5, 1939 |
| 2,402,342 | Phillip | June 18, 1946 |
| 2,445,525 | Gulden | July 20, 1948 |
| 2,474,994 | Tomalis | July 5, 1949 |

UNITED STATES PATENT OFFICE
CERTIFICATE OF CORRECTION

Patent No. 3,122,963            March 3, 1964

Rudolph E. Borgeson

It is hereby certified that error appears in the above numbered patent requiring correction and that the said Letters Patent should read as corrected below.

Column 1, line 23, for "fastors" read -- factors --; column 2, line 14, for "90°" read -- either 60° or 180° --.

Signed and sealed this 18th day of August 1964.

(SEAL)
Attest:

ERNEST W. SWIDER            EDWARD J. BRENNER
Attesting Officer            Commissioner of Patents